Figure 5:
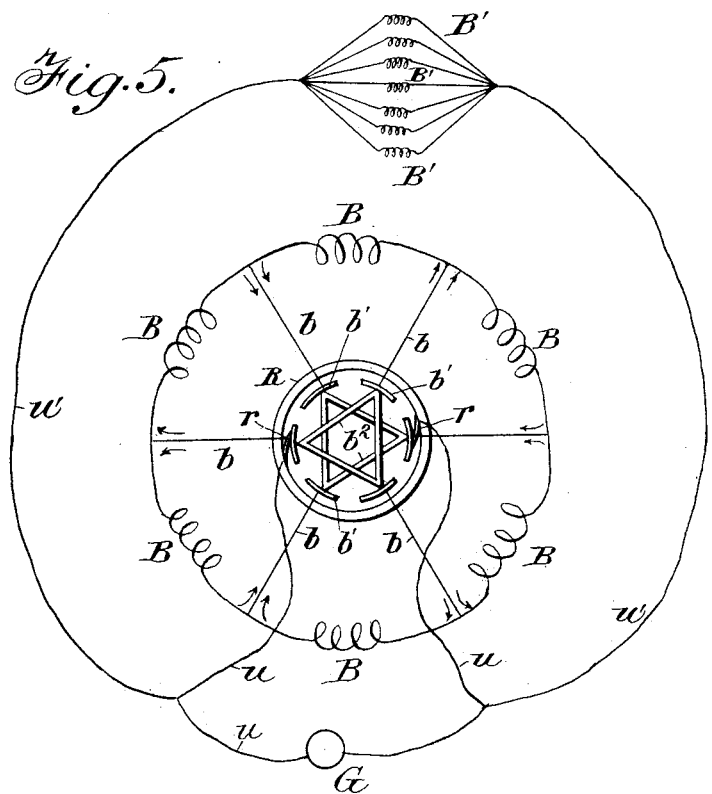

(No Model.) 3 Sheets—Sheet 1.
E. BERLINER.
ELECTRIC FURNACE GENERATOR.
No. 481,999. Patented Sept. 6, 1892.
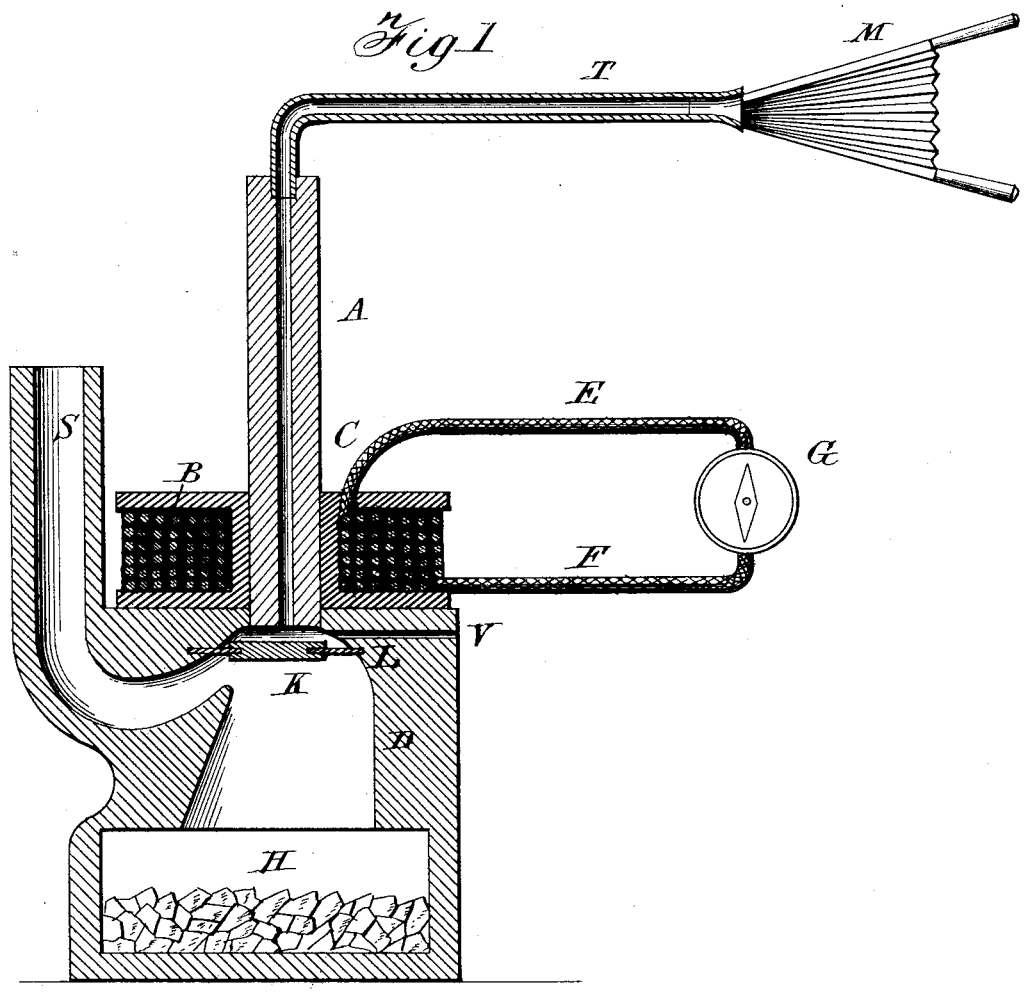
Witnesses:
F. T. Chapman
C. E. Marshall
Inventor,
Emile Berliner,
By Joseph Lyons,
Attorney

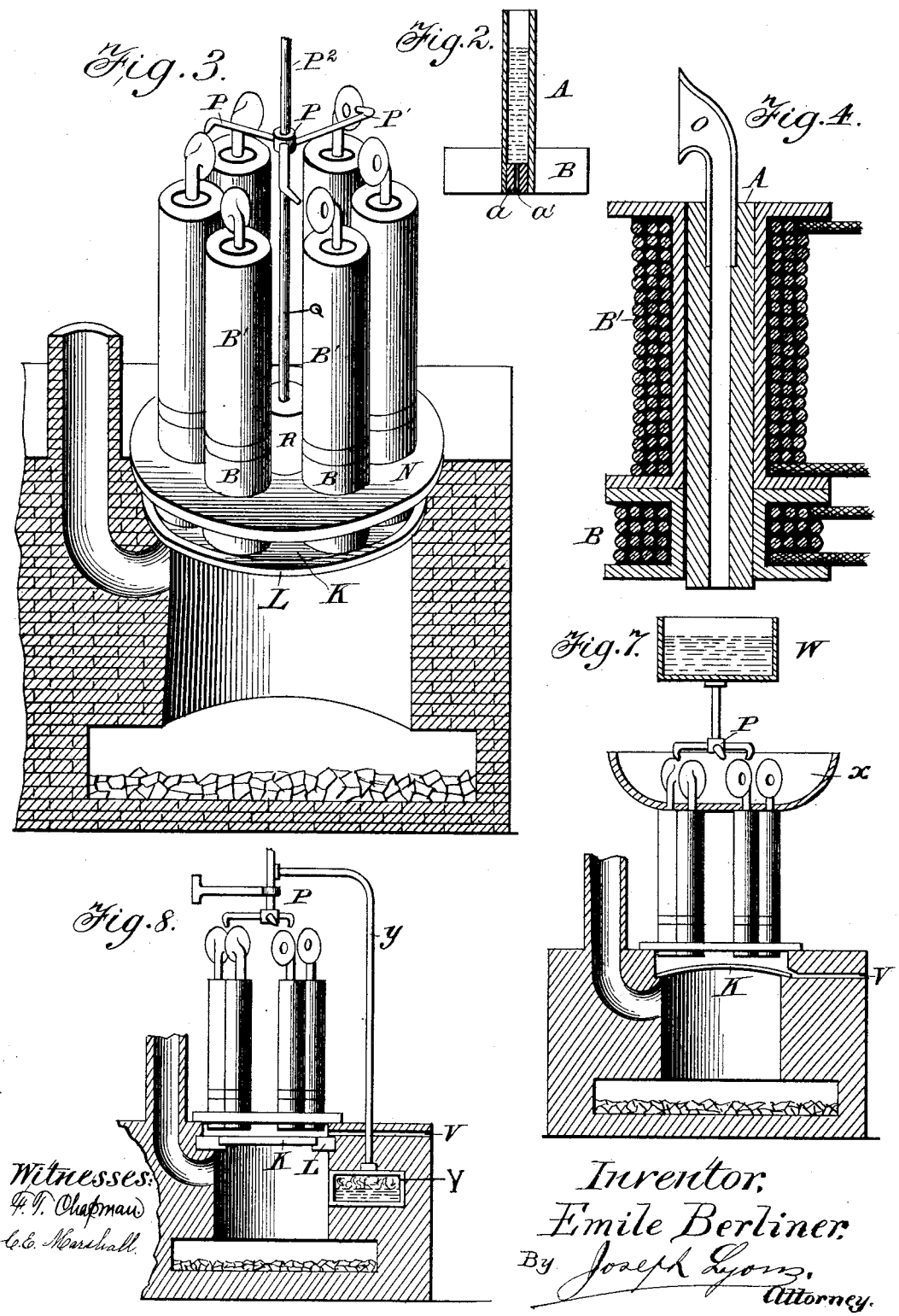

(No Model.) 3 Sheets—Sheet 3.

E. BERLINER.
ELECTRIC FURNACE GENERATOR.

No. 481,999. Patented Sept. 6, 1892.

Witnesses:
F. T. Chapman
E. E. Marshall

Inventor,
Emile Berliner,
By Joseph Lyons
Attorney

UNITED STATES PATENT OFFICE.

EMILE BERLINER, OF WASHINGTON, DISTRICT OF COLUMBIA.

ELECTRIC FURNACE GENERATOR.

SPECIFICATION forming part of Letters Patent No. 481,999, dated September 6, 1892.

Original application filed August 31, 1887, Serial No. 248,397. Divided and this application filed May 18, 1891. Serial No. 393,171. (No model.)

*To all whom it may concern:*

Be it known that I, EMILE BERLINER, a citizen of the United States, and a resident of Washington, in the District of Columbia, have invented certain new and useful Improvements in Electric Furnace Generators, of which the following is a specification.

My invention has reference to a novel method of generating electricity by the action of heat and to novel apparatus used in practicing the new method.

The invention is based upon two fundamental principles, which may be stated as follows:

First. The inductive capacity of magnetic metals is reduced by heat and becomes zero at a certain critical temperature, which is dependent upon the character of the metal. If the metal is cooled below the critical temperature, its inductive capacity increases first very rapidly and then very slowly until at a certain comparatively low temperature the inductive capacity of the metal reaches its maximum. Within these limits there is a decrease of inductive capacity for every increment of temperature and an increase of inductive capacity for every decrement of temperature.

Second. If a magnet is capable of carrying an armature of a mass of iron or other magnetic metal of a certain maximum weight, it will also be capable of carrying upon an armature of much smaller weight a mass of non-magnetic metal weighing about three-fourths of the maximum armature. For instance, if a magnet is capable of holding suspended a mass of iron—*i. e.*, an iron armature—weighing not more than, say, twenty pounds it will also be capable of holding suspended on it a mass of brass or other non-magnetic material weighing about fifteen pounds by means of an iron armature weighing only a fraction of an ounce.

I make use of the first principle by alternately heating and cooling a mass of magnetic material within a magnetic field of force and utilize the variations of magneto-inductive capacity thus produced for the generation of electrical impulses, and I make use of the second principle by selecting as the armature of varying inductive capacity a mass weighing only a small fraction of the weight of the maximum armature. By reason of the first principle I am enabled to generate electrical impulses by the direct action of heat, and by reason of the second principle I am enabled to do this effectively and rapidly with the expenditure of a minimum amount of heat.

Any cheap and convenient source of heat and any cheap and convenient cooling agent may be employed, and the apparatus used for this purpose may assume an indefinite number of forms. I am for this reason not confined to the use of any particular form of apparatus so long as the same are constructed upon the principles which form the basis of my invention or upon either of them.

In the accompanying drawings, which form a part of this specification, I have illustrated several forms of apparatus by means of which my novel method can be practiced, to wit:

Figure 1 is a vertical section, partly in elevation, of a simple form of my generator; Fig. 2, a vertical section of a modified detail of the same. Fig. 3 is a perspective view, partly in section, of a number of modified elementary generators combined in a single apparatus; Fig. 4, a vertical section of such element; Fig. 5, a diagram showing the circuit connections in the combined apparatus, and Fig. 6 a vertical section of the commutator of the same. Figs. 7 and 8 are elevations, partly in section, of modifications.

Referring now to Fig. 1, there is a permanent magnet A, with an axial bore C and a coil B of insulated wire around it near one end. The lower projecting end of the magnet is inserted into and closes an opening in the top of a furnace D.

E F are circuit-wires proceeding from the terminals of coil B to an electrical translating device G, which in this instance is represented as a galvanometer.

K is an armature of iron or other magnetic metal, preferably circular in form and mounted in a ring L, of brass or any other suitable non-magnetic material, and this annular support of the armature is inserted with its outer edge into the brick walls of the furnace, as shown. The armature is fairly within the inductive field of the magnet A, but not too close to the same, and its mass is determined in accordance with the second fundamental principle of my invention above explained— that is to say, the weight of the armature is only such fraction of the maximum magnetic weight which the magnet can carry that will enable it to carry about three-fourths of such weight of non-magnetic material.

H is the fire-box of the furnace, and S the chimney of the same. A fire started at H will heat the armature K, and in the operation of the apparatus care must be taken that the temperature of the armature is not increased beyond the critical point. It will now be understood that the products of combustion will strike the lower side of the armature and will then pass out through the chimney, but will never come into contact with the upper side of the armature. A tube T is inserted into the top of the magnet and is connected to a pair of bellows M, and a vent-hole V from the chamber formed by the armature K, ring L, the top of the furnace, and magnet A communicates with the open air. If now the furnace be started, the armature K will be heated, and if the same be made of iron it should never be heated beyond a bright red heat, which is the critical point for iron. In this condition the armature has lost the greater part of its inductive capacity, and during this process a current of electricity is generated in the coil B in accordance with the well-known law of magneto-electric induction. The effect of the slowly-decreasing magnetic capacity of the armature upon the magnet is obviously the same as if said armature were slowly removed from the magnet. The current thus generated in the coil will be naturally very weak. If now the bellows be compressed, a puff of cold air will be forced down through the axial bore of the magnet and will impinge upon the heated armature, cooling the same instantly, and then passing out through the vent-hole V. The sudden cooling of the armature has the effect to suddenly increase its inductive capacity, and the effect upon magnet A and coil B will be the same as if the armature had suddenly been brought nearer the pole of the magnet. A strong electric current will be generated in the coil and will operate the translating device G. As soon as the cooling agent (in this instance air) has escaped through the vent-hole, the temperature of the armature again rises and another current of electricity, but in the opposite direction, is generated in the coil. Thus it will be understood that by alternately compressing and dilating the bellows a series of alternating magneto-electrical impulses are generated. These impulses may be made to succeed each other with considerable rapidity and may be utilized for the operation of any suitable electrical apparatus.

By reference to Fig. 1 it will be seen that the channel which connects the chimney with the combustion-chamber is curved downwardly below the under side of the armature and that the latter partly obstructs the outlet into the chimney. This is of importance, for by this construction, the armature is placed into the path of the products of combustion, and the heat generated is thereby utilized to best advantage.

In place of air other cooling agents may be employed, and among these water, on account of its great thermal capacity, may be used with special advantage.

In Fig. 2 an arrangement for this purpose is indicated. The axial bore of the permanent magnet is in this instance made wider, but is closed at its lower end by a plug $a$, having a small bore $a'$. The hollow of the magnet is filled or partly filled with water, which is maintained at the same level by any of the well-known means for this purpose. The bore $a'$ is so small that the water will issue from the same in drops at regular intervals, and these drops of water, falling upon the heated armature, rapidly evaporate, and thereby abstract a considerable amount of heat from the same, the vapors escaping through the vent-hole V.

Any number of generators of the kind so far described may be united for joint operation in a single apparatus, the alternating currents therein generated may be commutated, and the principle of self-excitation, as in ordinary dynamos, may be utilized. Fig. 3 represents such apparatus. The furnace is constructed substantially in the manner described with reference to Fig. 1, with slight unimportant modifications. The armature K, mounted in the ring L of non-magnetic material in the brickwork of the furnace, is large enough to act upon a number of magnets, which in this instance are not permanent, but electro-magnets, the cores being of soft or cast iron. Fig. 4 shows the construction of these magnets. The cores have the same kind of axial bore as in Fig. 1, and in addition to the inducing-coil B there is a coil B', which I shall call the "field-coil." A flaring funnel O, being in communication with the axial bore of the core, is placed upon each magnet. Six of these magnets are shown in Fig. 3; but any other number may be used. They are mounted upon a plate N, of non-magnetic material, which at the same time is preferably a poor conductor of heat and which forms the top of the furnace. The magnets are arranged in a circular row at equal distances apart, and the lower pole of each projects through the plate N into inductive proximity to the armature. A reaction-wheel P, having a suitable number of horizontal ejecting-arms P', is arranged with its hollow shaft $P^2$ vertically in the axial line of the group of magnets. The arms move in the horizontal plane which just clears the funnels O, and the ejecting-nozzles are bent slightly downward, so that the fluid issuing from the same will enter the flaring opening of the funnels, and then, passing down through the bore of the cores, will exert its cooling action upon that part of the armature which is immediately below the pole of the respective magnet. The reaction-wheel may be actuated either by air or by water or by any other suitable cooling agent. If actuated by air, the hollow shaft P² is connected with a suitable reservoir of compressed air. (Not shown in the drawings.) From the point where the reaction-tubes P' branch off a solid shaft Q extends downwardly in the prolongation of the line of hollow shaft P². This shaft Q carries the commutator-brushes and collecting-disks, which will be described farther on. It will now be understood that by the action of the reaction-wheel a quantity of air or water or other cooling agent will be intermittently injected into the bore of each magnet and will alternately cool and allow to be heated a portion of the armature immediately below each magnet. In the drawings I have shown six magnets and three ejecting-nozzles in the reaction-wheel. Consequently the alternations of cooling and heating of successive portions of the armature will be so timed that while the part below one magnet is cooled the parts below the two adjacent magnets will be heated. From this it will now be understood that the directions of currents in the inducing-coils of two adjacent magnets will always be opposed.

Figure 6:
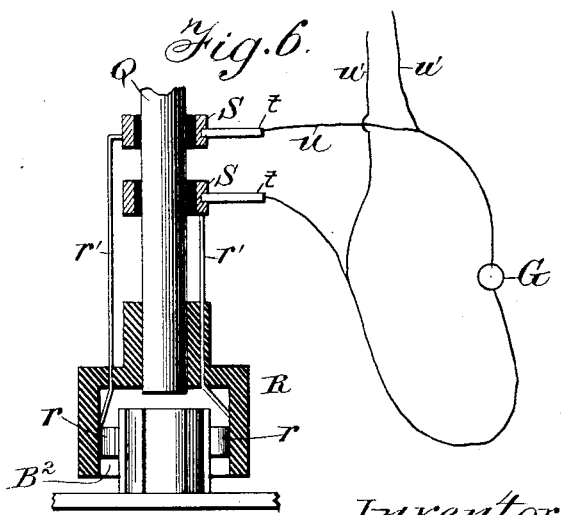

The circuits within the generator and the commutator are illustrated in Figs. 5 and 6. The generator-coils B B are all connected in series, as shown diagrammatically in Fig. 5, and the course of the currents through the same is indicated by arrows. From points between the successive coils connections $b$ $b$ are made to the metallic segments $b'$ $b'$ of a commutator B², mounted upon the top plate N of the furnace, (see Fig. 6,) and the alternate segments are connected together by triangular webs $b^2$, as shown in Fig. 5. Shaft Q carries at its lower end a hub R, of insulating material, to the inner surface of which at two diametrically-opposite points are secured the commutator-brushes, which bear upon the commutator-plates, as usual, the only difference being that in this case the commutator-segments are stationary and the brushes revolve with shaft Q. From each brush there is an electrical connection $r'$ to a collecting ring or sleeve $s$, and collecting-brushes $t$ $t$, bearing upon the sleeves $s$ $s$, are connected with the external circuit, in which the current is utilized in suitable translating devices, (represented in the drawings by letter G.) A shunt-circuit $u'$ $u'$ includes the field-coils B' B', which are shown connected in multiple arc, but which may be connected in series or in any other suitable manner.

When a machine of this construction is started, the cores of the magnets should be slightly energized by an external source—as, for instance, by touching the same with a permanent magnet. In a very short time the self-exciting action of the generator will energize the cores and no further exterior assistance will be necessary.

In the apparatus shown in Fig. 7 the cooling agent employed is water or any other suitable fluid placed in a reservoir W. In this case it is sometimes necessary to make the armature slightly curved, as shown, to allow the water to discharge by the vent-holes, of which there is one for every magnet, before evaporation whenever by reason of the Leidenfrost phenomenon the water should not evaporate with sufficient rapidity. A basin X, placed upon the tops of the magnets, with the stems of the funnels passing through the same, may be employed for retaining the water ejected from the nozzles between the successive funnels.

In the construction shown in Fig. 8 steam of comparatively low temperature and pressure is employed as cooling agent. A small steam-boiler Y, properly located in the furnace, produces the steam. The same is carried by a tube $y$ to the reaction-wheel.

In every other respect the operations of the modifications shown in Figs. 7 and 8 are the same as in the form of generator described with reference to Figs. 3, 5, and 6. It was for this reason not deemed necessary to show the connections to the commutator.

In construction of the various forms of generators here described the same fundamental principles are observed. There is primarily a magnetic field of force of a certain density and a conductor of electricity placed within the same. The field of force is furnished by an electro-magnet and an armature for the same, and by the variable action of heat the density of the field of force about the conductor is varied. The action of heat is made variable by a cooling agent, which is made to act upon the heated elements which constitute the field intermittently.

The electro-magnet is composed of a core and a coil of insulated wire, the latter being the conductor of electricity within the field. The core may be either a permanent magnet or comparatively inert—i. e., it may be made of soft iron. The mass of the armature is always comparatively small, representing only a small fraction of the weight of magnetic material which the magnet can support when saturated.

If a number of generators are combined in one apparatus to constitute a battery of my elementary magneto-electric generators, the currents generated by the elements are collected by suitable commutators, which are timed and spaced to correspond with the periods of introduction of the cooling agent. For this purpose the same mechanism which distributes the cooling agent to the individual fields of force also operates the commutator. I have shown a reaction-wheel as the means for accomplishing this result; but it is clear that other means may be employed with the same effect.

I do not herein claim the broad features of my invention, since the same are fully claimed in another pending application, Serial No.

248,397, filed August 31, 1887, of which this is a division, but confine my claims in this case to special features of operation and construction which are in the nature of improvements upon and special applications of the method of generating electricity by varying the inductive capacity of the armature of a magnetic core surrounded by a coil of insulated wire by the action of heat.

Having now fully described my invention, I claim and desire to secure by Letters Patent—

1. In an electric generator, the combination of an electro-magnet having an axial bore and an armature in front of the same with a heater acting upon the armature and a cooling apparatus for intermittently passing a cooling fluid through the bore of the magnet against the armature, substantially as described.

2. In an electric generator, the combination of an electro-magnet and an armature supported by non-magnetic material with a heater for heating the armature and a cooler for intermittently cooling the same, substantially as described.

3. In an electric generator, the combination of an electro-magnet having an axial bore and an armature facing the same with a heater acting upon one side of the armature, a source of cooling fluid discharging intermittently through the bore of the magnet against the other side of the armature, and a vent opening or openings for the escape of the cooling fluid, substantially as described.

4. In an electric generator, the combination of a series of electro-magnets and a common extended armature for the same with a heater acting upon one side of the armature and a cooling agent acting intermittently and in rotation upon the individual portions of the armature which are opposed to the individual magnets, substantially as described.

5. In an electric generator, the combination of a series of electro-magnets and a common extended armature facing the same with a heater acting upon the whole surface of one side of the armature, a cooling apparatus acting intermittently and in rotation upon the individual sections on the other side of the armature which are exposed to the individual magnets, and a commutator and collector for straightening the alternating currents thus generated and for conveying the same to the line, substantially as described.

6. In an electric generator, the combination of a series of electro-magnets and a common armature for the same, a heater for heating the whole surface of one side of the armature, a reaction-wheel driven by a cooling fluid, projecting intermittently and in rotation jets of the fluid against the individual sections on the other side of the armature which are exposed to the individual magnets, and a commutator and collector actuated by the reaction-wheel, substantially as described.

7. In an electric generator, the combination of a series of individual magnetic systems exposed to the action of heat and electric conductors included in a circuit or circuits traversing the fields with a reaction-wheel for projecting a cooling agent against the magnetic systems in rotation, substantially as described.

8. The method of generating electricity in a conductor traversing a magnetic field, which consists in subjecting the elements of the field to the continuous action of heat and to the intermittent action of a cooling agent, substantially as described.

9. The method of generating electricity in a conductor traversing a magnetic field, which consists in subjecting the elements of the field to the continuous action of heat and at the same time intermittently cooling the same, substantially as described.

In testimony whereof I have signed my name to this specification in the presence of two subscribing witnesses.

EMILE BERLINER.

Witnesses:
F. T. CHAPMAN,
JOSEPH LYONS.